(12) United States Patent
Selvam

(10) Patent No.: US 11,680,452 B2
(45) Date of Patent: Jun. 20, 2023

(54) SYSTEM AND METHOD FOR DISASSEMBLING DRILL ASSEMBLIES

(71) Applicant: Caterpillar Global Mining Equipment LLC, Denison, TX (US)

(72) Inventor: Sudhagar Selvam, Vijayanagar (IN)

(73) Assignee: Caterpillar Global Mining Equipment LLC, Denison, TX (US)

( * ) Notice: Subject to any disclaimer, the term of this patent is extended or adjusted under 35 U.S.C. 154(b) by 0 days.

(21) Appl. No.: 16/714,236

(22) Filed: Dec. 13, 2019

(65) Prior Publication Data

US 2020/0392801 A1 Dec. 17, 2020

(30) Foreign Application Priority Data

Jun. 12, 2019 (IN) .............................. 201911023287

(51) Int. Cl.
| | |
|---|---|
| *E21B 19/20* | (2006.01) |
| *E21B 19/14* | (2006.01) |
| *E21B 19/18* | (2006.01) |
| *E21B 17/042* | (2006.01) |
| *E21B 3/02* | (2006.01) |
| *B23B 31/12* | (2006.01) |
| *E21B 19/24* | (2006.01) |

(52) U.S. Cl.
CPC ............ *E21B 19/20* (2013.01); *E21B 19/146* (2013.01); *B23B 31/1238* (2013.01); *E21B 3/02* (2013.01); *E21B 17/042* (2013.01); *E21B 19/18* (2013.01); *E21B 19/24* (2013.01)

(58) Field of Classification Search
CPC ...... E21B 19/16; E21B 19/161; E21B 19/163; E21B 19/164; E21B 19/168; E21B 19/146; E21B 3/02; E21B 17/042; E21B 19/18; B23B 31/1238

See application file for complete search history.

(56) References Cited

U.S. PATENT DOCUMENTS

| | | | |
|---|---|---|---|
| 6,688,394 B1 * | 2/2004 | Ayling | .................... E21B 21/01 166/380 |
| 7,377,338 B2 | 5/2008 | Bassinger | |
| 9,523,269 B2 | 12/2016 | Houit et al. | |
| 9,534,444 B2 | 1/2017 | Kraft et al. | |
| 10,041,309 B2 | 8/2018 | Bruandet | |
| 2017/0234085 A1 * | 8/2017 | Gaska | ................... E21B 19/163 166/77.51 |
| 2017/0234087 A1 | 8/2017 | Gaska et al. | |
| 2019/0010770 A1 * | 1/2019 | Recker | .................... E21B 19/08 |
| 2019/0119998 A1 * | 4/2019 | Ruehmann | ............ E21B 19/165 |

* cited by examiner

Primary Examiner — Dany E Akakpo

(57) ABSTRACT

A system for disassembling a drill assembly including a drill bit and one or more columns interlinked with each other. The system includes a first clamping mechanism adapted to engage one of the drill bit or a first column, and a second clamping mechanism adapted to engage a second column disposed successively to the drill bit or the first column. The second clamping mechanism is turned relative to the first clamping mechanism to at least partially delink the second column from the first column or the drill bit. The system further includes a first actuator adapted to move one of the first clamping mechanism or the second clamping mechanism relative to the other to define a gap therebetween to reveal an interface between the second column and the drill bit or the first column for delinking the second column relative to the drill bit or the first column.

15 Claims, 16 Drawing Sheets

SYSTEM AND METHOD FOR DISASSEMBLING DRILL ASSEMBLIES

TECHNICAL FIELD

The present disclosure relates to drill machines (e.g. a drill rig), and more particularly, to a system and a method for disassembling a drill assembly of a drill machine for use in applications such as mining and other down-hole drilling applications (e.g. petroleum, natural gas, wells, etc.).

BACKGROUND

A drilling machine is often used to drill a borehole. Drilling machines generally include equipment to drill water wells, oil wells, or natural gas extraction wells. Drilling machines are generally known to include a drill tower equipped with a drill carousel which provides drill extenders, for example, drill rods, drill pipes, columns, etc., as needed for advancing a drilling tool into a borehole.

A combination of drill extenders may form a drill string for drilling a borehole of a desired depth. As an example, the first and/or the lowermost drill extender in the drill string may receive a drilling tool at its lower end to perform the drilling operation. The drilling tool is usually a drill bit or a hammering tool. More often than not, the drilling tool and/or columns of the drill string may need to be withdrawn from the borehole, for example, for service, replacements, etc. However, the process of withdrawing the drilling tool and/or the columns is a tedious affair.

U. S. Patent Publication 2017234087 discloses a blasthole drill including a drill tower. The blasthole drill includes a drill pipe, which is configured to extend into a borehole. In the blasthole drill, multiple drill pipes are connected together to form an elongated drill string that extends into the borehole. The blasthole drill further includes a breakout wrench that is moveably coupled to the drill tower for engaging and applying torque to the drill pipe to break the threaded joint between the drill pipe and a drill bit.

SUMMARY

In an aspect of the disclosure, a system for disassembling a drill assembly is disclosed. The drill assembly includes a drill bit and one or more columns interlinked with each other. The columns are adapted to extend the drill bit into a borehole defined through a surface. The system includes a first clamping mechanism adapted to engage one of the drill bit or a first column of the columns, and a second clamping mechanism adapted to engage a second column of the columns. The second column is disposed successively to one of the drill bit or the first column. The second clamping mechanism is adapted to be turned relative to the first clamping mechanism to at least partially delink the second column from the first column or the drill bit. The system further includes a first actuator adapted to move one of the first clamping mechanism or the second clamping mechanism relative to the other of the first clamping mechanism or the second clamping mechanism to define a gap therebetween to reveal an interface between the second column and the drill bit or the first column for delinking the second column relative to the drill bit or the first column.

In another aspect of the disclosure, a machine is disclosed. The machine comprises a main frame, a rail coupled to the main frame and adapted to be moved for alignment along a height and a width of the main frame, and a drill assembly slidably retained relative to the rail and adapted to facilitate drilling of a borehole through a surface. The drill assembly includes a drill bit, and one or more columns interlinked with each other and with the drill bit. The columns are adapted to extend the drill bit into the borehole. The machine further includes a system for disassembling the columns and the drill bit of the drill assembly. The system includes a first clamping mechanism adapted to engage one of the drill bit or a first column of the columns, and a second clamping mechanism adapted to engage a second column of the columns, where the second column is disposed successively to the one of the drill bit or the first column. The second clamping mechanism is adapted to be turned relative to the first clamping mechanism to at least partially delink the second column from the first column or the drill bit. The system further includes a first actuator adapted to move one of the first clamping mechanism or the second clamping mechanism relative to the other of the first clamping mechanism or the second clamping mechanism to define a gap therebetween to reveal an interface between the second column and the drill bit or the first column for delinking the second column relative to the drill bit or the first column.

In yet another aspect of the disclosure, a method for disassembling a drill assembly is disclosed. The drill assembly includes a drill bit and one or more columns interlinked with each other. The columns are adapted to extend the drill bit into a borehole defined through a surface. The method comprises moving, by a first actuator, one of a first clamping mechanism or a second clamping mechanism relative to the other of the first clamping mechanism or the second clamping mechanism to define a gap therebetween to reveal an interface between a first column of the columns or the drill bit and a second column of the columns for delinking the second column relative to the drill bit or the first column—the second column being disposed successively to the one of the drill bit or the first column. The method further includes engaging one of the drill bit or the first column by the first clamping mechanism, and engaging the second column by the second clamping mechanism. The method furthermore includes turning, by a second actuator, the second clamping mechanism relative to the first clamping mechanism to at least partially delink the second column from the first column or the drill bit.

DETAILED DESCRIPTION

Reference will now be made in detail to embodiments of the disclosure, examples of which are illustrated in the accompanying drawings. Wherever possible, the same reference numbers will be used throughout the drawings to refer to the same or like parts.

Figure 1:
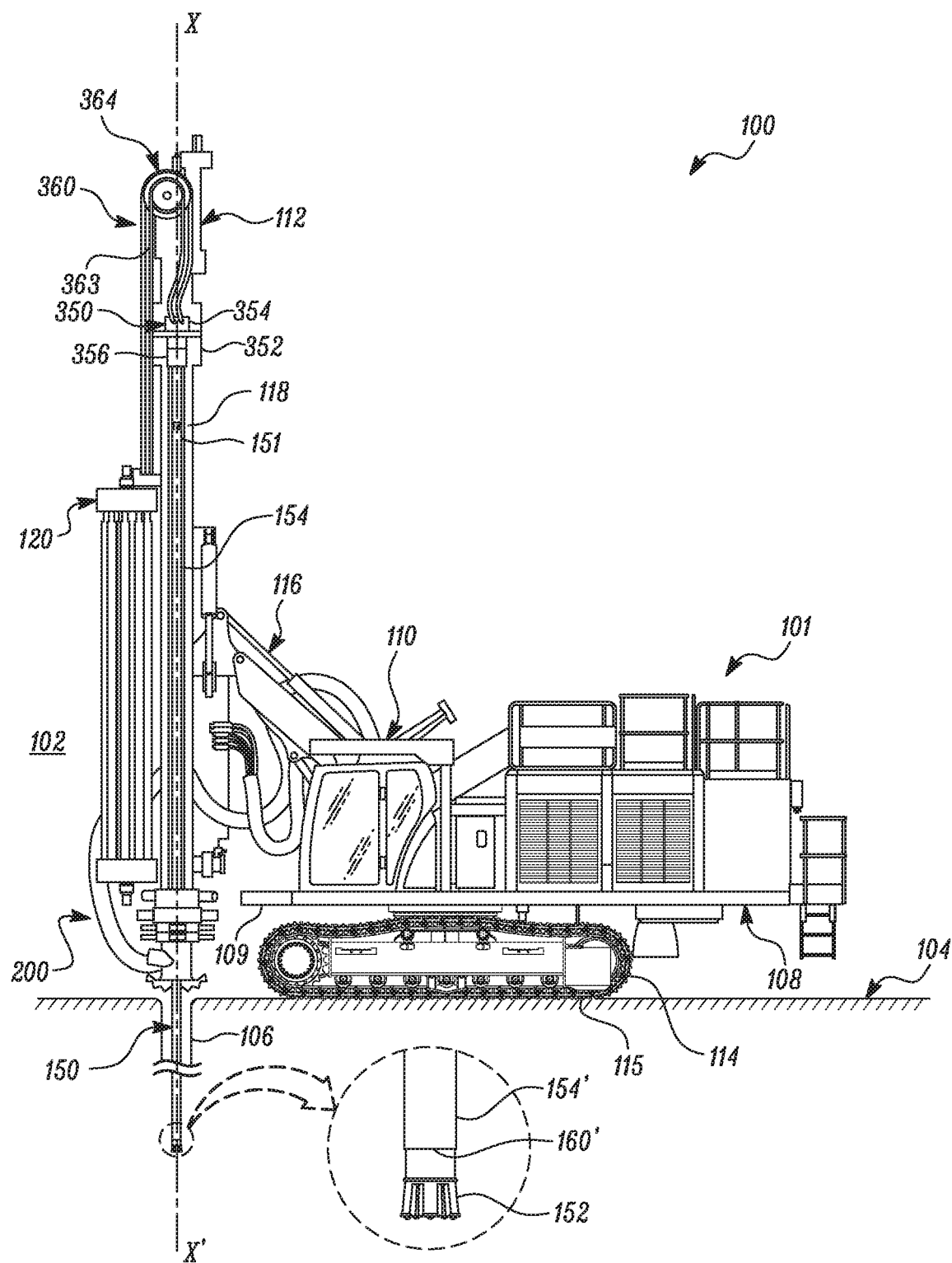
FIG. 1 is a machine including a drill assembly used for drilling a borehole, in accordance with an embodiment of the present disclosure.

Referring to FIG. 1, a machine 100 is illustrated. The machine 100 operates at a worksite 102. To provide one non-limiting example of the machine 100 in which embodiments of the present disclosure may be implemented, the machine 100, shown in FIG. 1, is a drilling machine 101 and may include a rotary drill or a blast hole drill. The machine 100 may include a drill assembly 150 for drilling or otherwise forming holes, channels, tunnels or openings into, within, and/or extending into, and/or below, a work surface 104 of the worksite 102 for any application in which penetration of a surface via a drill assembly may be utilized. For example, the drill assembly 150 may include a drill bit 152, and thus may be utilized for sub-surface mineral extraction, such as, oil or natural gas; mineral exploration or environmental exploration drilling; hydraulic fracturing; oil, gas, and/or water extraction wells; rock cut drilling for mining and/or quarrying operations; and the like. Aspects of the present disclosure are directed towards a system 150 (discussed later) for disassembly of the drill assembly 150. It will be appreciated that such aspects may be applied to any environment where a drill assembly, such as the drill assembly 150, needs to be disassembled.

The machine 100 may be an operator operated machine. However, in various embodiments, the machine 100 can have varying levels of autonomy. For instance, the machine 100 may be an autonomous machine, a semiautonomous machine, a remotely operated machine, or a remotely supervised machine. The machine 100 includes a main frame 108, a power source (not shown), an operator station 110, a mast 112 and the drill assembly 150.

The power source may include any suitable power source or system capable of generating and/or supplying power to operate the machine 100 (as well as the systems and components thereof, as disclosed herein). The power source may include, but not limited to, a diesel engine, a gasoline engine, a gaseous fuel-powered engine, an electric motor, a fuel cell, a battery, and/or combinations thereof. In an embodiment, the power source may be mounted on the main frame 108 of the machine 100. The machine 100 may include a transmission system (not shown) mechanically coupled to and powered by the power source. The transmission system may facilitate transfer of motive power from the power source to one or more ground engaging propulsion members 114 of the machine 100.

The ground engaging propulsion members 114 are coupled to the main frame 108 and support the main frame 108 above the work surface 104. Further, the ground engaging propulsion members 114 engage the work surface 104 to effectuate one or more of movement, turning, positioning, and travel of the main frame 108 (and thus the machine 100) on the work surface 104. In the exemplary embodiment illustrated in FIG. 1, the ground engaging propulsion members 114 are embodied as a pair of endless track assemblies 115 disposed on opposite sides of the machine 100 with an additional endless track assembly, identical to the track assembly 115, being hidden behind the endless track assembly 115 in the configuration of the machine 100 as shown in FIG. 1. However, it should be understood that the two or more ground engaging propulsion members 114 may alternatively be embodied as two or more wheels or any other suitable devices capable of effectuating one or more of movement, turning, positioning, and travel of the machine 100, over the work surface 104.

The operator station 110 is mounted on the main frame 108, and in the embodiment shown in FIG. 1, the operator station 110 is mounted at an end 109 of the main frame 108. The operator station 110 may include an operational control system, which may include one or more control devices which can include and be embodied as any one or more of one or more joysticks, pedals, levers, buttons, steering wheels, and any other suitable control device or interface (or any of various combinations thereof) configured to be actuated or otherwise engaged to effectuate control of the machine 100 as well as the various systems and components thereof according to any of the embodiments, as disclosed herein, including, in part, to engage the operation of the machine 100 according a plurality of particular modes of operation for the machine 100, which can include, in part, a working/drilling mode of operation by way of the drill assembly 150.

As illustrated in FIG. 1, the mast 112 is mounted on the main frame 108. The mast 112 (may also be referred to as a derrick or tower) may be movable relative to the main frame 108 between a substantially vertical position and a non-vertical position via use of a mast shift cylinder 116. It can be contemplated that the mast shift cylinder 116 may be adapted to facilitate alignment of the mast 112 along a height and a width of the main frame 108. Varying the position of the mast 112 (via the mast shift cylinder 116) may allow changing or repairing components of the drill assembly 150. The mast 112 may be a linearly extending structure, and in the exemplary embodiment and configuration of the machine 100, as illustrated in FIG. 1, is upright, extending along a longitudinal axis X-X'.

The mast 112 may include a pair of supporting rails 118. The supporting rails 118 may be adaptable to slidably retain various components of the drill assembly 150 and facilitate movement of the drill assembly 150 along the longitudinal axis X-X' of the mast 112. The supporting rails 118 may be composed of several smaller lengths of rails joined together to achieve a desired rail length, or optionally, may include a unitarily formed integrated structure.

The drill assembly 150 includes a drill string 151 applicable to drill a borehole 106 into the work surface 104. The drill string 151 may include the drill bit 152 and one or more columns 154 interlinked with each other and with the drill bit 152. The columns 154 facilitate an extension of the drill bit 152 into the borehole 106. Each of the columns 154 of the drill assembly 150 may be of hollow, generally cylindrical configuration. For example, each column 154 may be coupled to the other column 154 by way of a threaded connection. In other embodiments, the columns 154 may be interlinked with each other by way of other similar connections, for example, by luer-lock fittings, snap-fittings, or the like.

The drill bit 152 of the drill assembly 150 may include a cutting tool which is coupled at an end of the drill string 151 (or a lowermost column 154 of the drill assembly 150) which extends into the borehole 106. The drill bit 152 may be linked with the lowermost column 154' by way of a threaded connection, although other connections possibilities may exist. In some embodiments, the drill bit 152 may be hammer based (e.g., one in which a drilling of the borehole 106 is facilitated through a hammering action of the drill bit 152), in which case the column 154' disposed successively to the drill bit 152 may include a hammer (not shown) adapted to transmit a hammering action to the drill bit 152 to drill the borehole 106. The drill bit 152 may be selected from a variety of drill bits available depending upon the type of machine 100, the work surface 104 into which the borehole 106 may be drilled, etc. Although, the drill bit 152 has been described to be linked with the lowermost column 154' by a threaded connection, the drill bit 152 may be linked with the lowermost column 154' by way of other similar connections, for example, by luer-lock fittings, snap-fittings, or the like.

Figure 7:
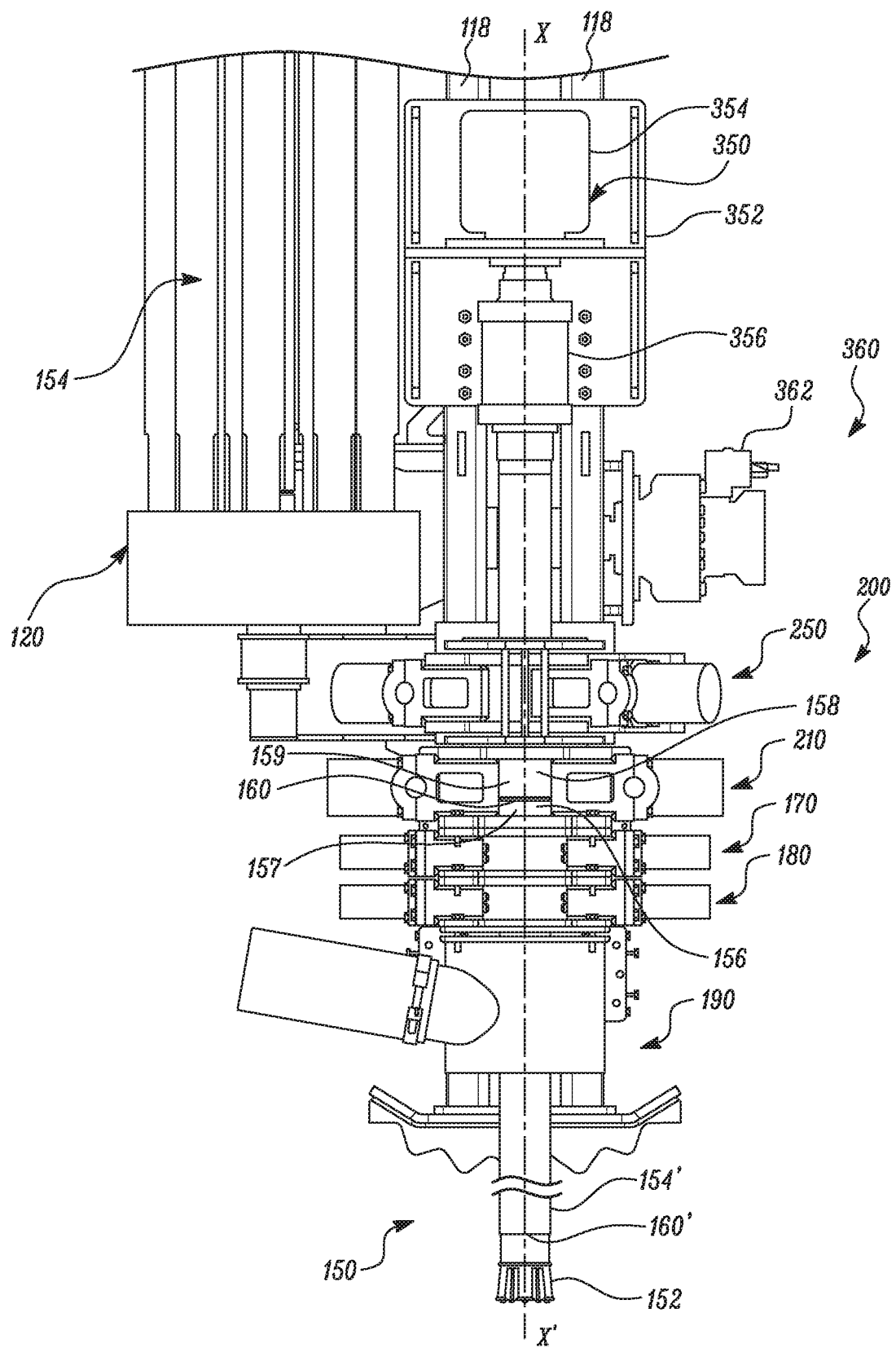
FIGS. 7-15 illustrate various positions of the drill assembly and the components of the system for disassembling the drill assembly, in accordance with an embodiment of the present disclosure.

According to an exemplary embodiment, and for various explanatory purposes, the drill assembly 150 (or the drill string 151) may be understood as being formed by the drill bit 152, at least one first column 156 of the columns 154, and at least one second column 158 of the columns 154 (as shown in FIG. 7). The first column 156 may be a column 154 of the drill string 151 which is disposed proximal to (e.g., immediately next to) the drill bit 152, whereas the second column 158 may be a column 154 which is disposed successively to (e.g., immediately next to) the first column 156, when moving up the borehole 106. By implication, the first column 154 may embody the aforesaid, lowermost column 154' of the columns 154—if any case the first column 156 were omitted from the drill string 151 or the drill assembly 150, the second column 158 may be construed to be the column 154 (or the lowermost column 154') disposed successively to the drill bit 152. Nevertheless, aspects of the present disclosure, as described above, promulgates that the drill string 151 includes the (at least one) first column 156, the (at least one) second column 158, and the drill bit 152. While representative of multiple columns 154, for ease, the (at least one) first column 156 may be simply referred to as a first column 156, and, similarly, the (at least one) second column 156 may be simply referred to as a second column 156.

The drill assembly 150 further defines interfaces between every successive pair of columns 154 and between the lowermost column 154' and the drill bit 152. For example, the interface between every successive pair of columns 154 (or between the first column 156 and the second column 158) may be referred to as an interface 160 (see FIG. 7), while the interface between the lowermost column 154' and the drill bit 152 may be referred to as interface 160' (see FIG. 7). The interface 160 defines a breakout region where one column 154 may be separated or released relative to the other successive column 154, while the interface 160' defines a breakout region between the lowermost column 154' and the drill bit 152 where the lowermost column 154' may be separated or released relative to the drill bit 152.

In accordance with the disclosure, the drill assembly 150 (or the drill string 151) may be adapted to be movable relative to the mast 112. The drill assembly 150 may be slidably coupled with the supporting rails 118 of the mast 112 and may be driven by a motor (not shown) to slidably move relative to the mast 112 on the supporting rails 118, along the longitudinal axis X-X'.

The drill assembly 150 further includes a carousel 120. The carousel 120 may be structured and adapted to store and support one or more columns 154 of the drill assembly 150 when the drill assembly 150 or the drill string 151 is not in use. In one example, the carousel 120 includes a plurality of slots configured to hold the columns 154. The carousel 120 may also be used to add columns 154 of the drill assembly 150 to form the drill string 151 when in use.

Figure 2:
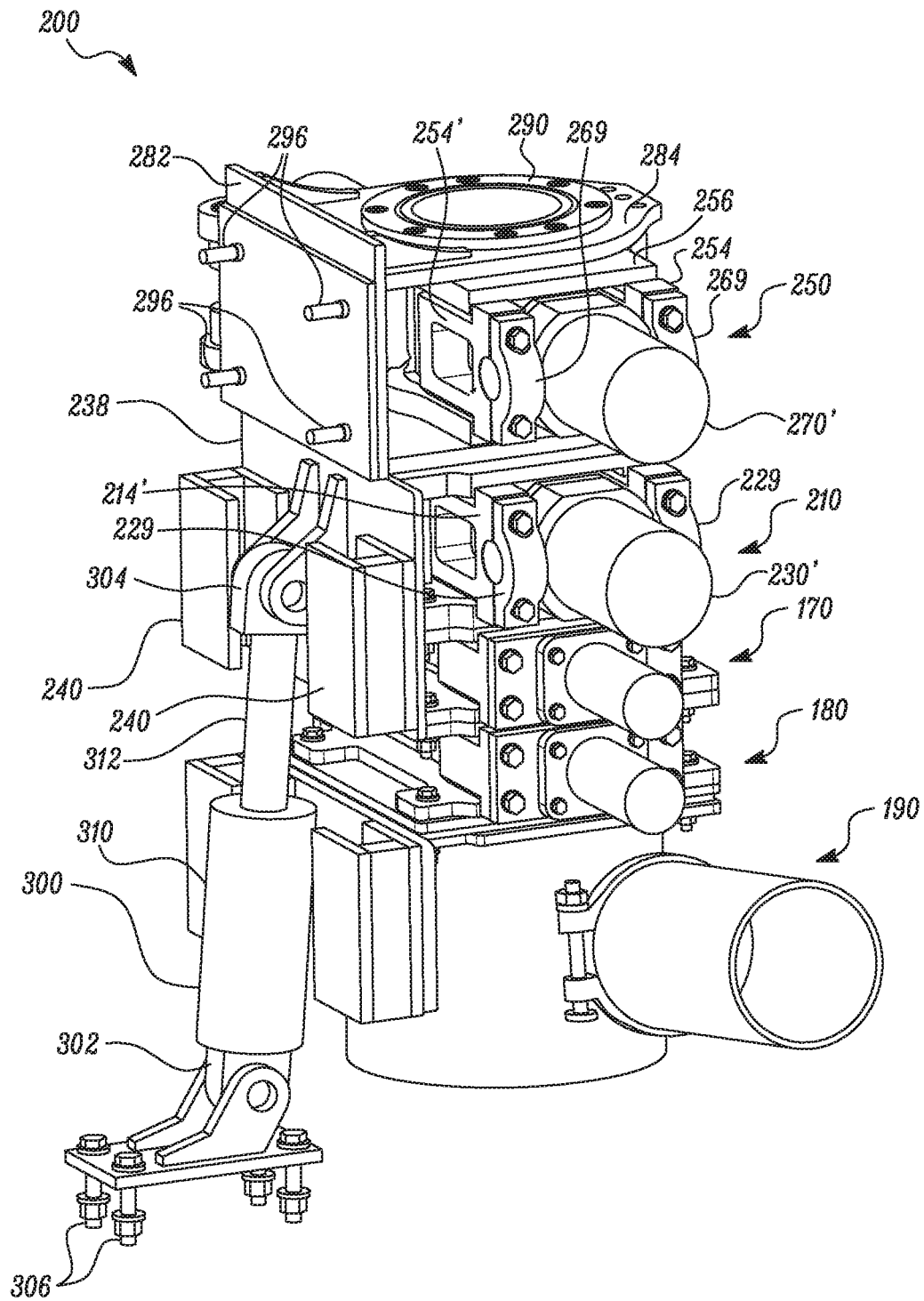
FIG. 2 is a perspective view of a system applied for disassembling the drill assembly, in accordance with an embodiment of the present disclosure.
Figure 3:
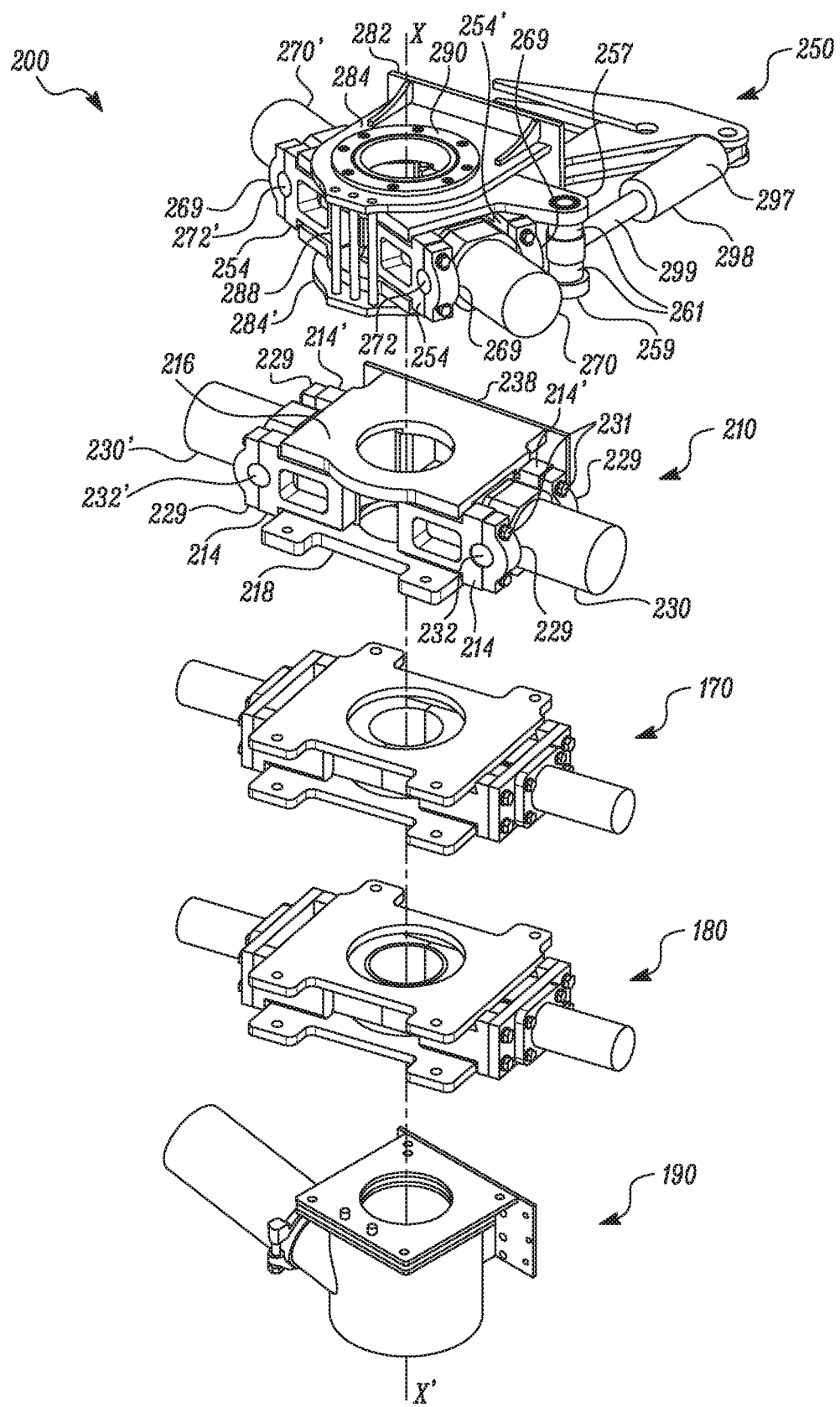
FIG. 3 is an exploded view of the system, illustrating various components of the system of FIG. 2, in accordance with an embodiment of the present disclosure.

In certain embodiments, as illustrated in FIGS. 2 and 3, the machine 100 may include one or more centralizers for centralizing or aligning the columns 154 of the drill assembly 150. Examples of such centralizers include a hammer centralizer 170 and a pipe centralizer 180, which may be adapted to centralize the hammer and columns 154 of the drill assembly 150, respectively. Further, in an embodiment, the machine 100 may include a drill pick up pot 190, which may be adapted to collect (and, in some cases, evacuate) dirt, debris, or the like during the operation of the drill machine 100.

Referring to FIGS. 2-5, the machine 100 may further include a system 200 for disassembling the one or more components (or columns 154) of the drill assembly 150. The system 200 includes a first clamping mechanism 210, a second clamping mechanism 250, and a first actuator 300, all of which work in concert to disassemble one or more components of the drill assembly 150.

Figure 4:
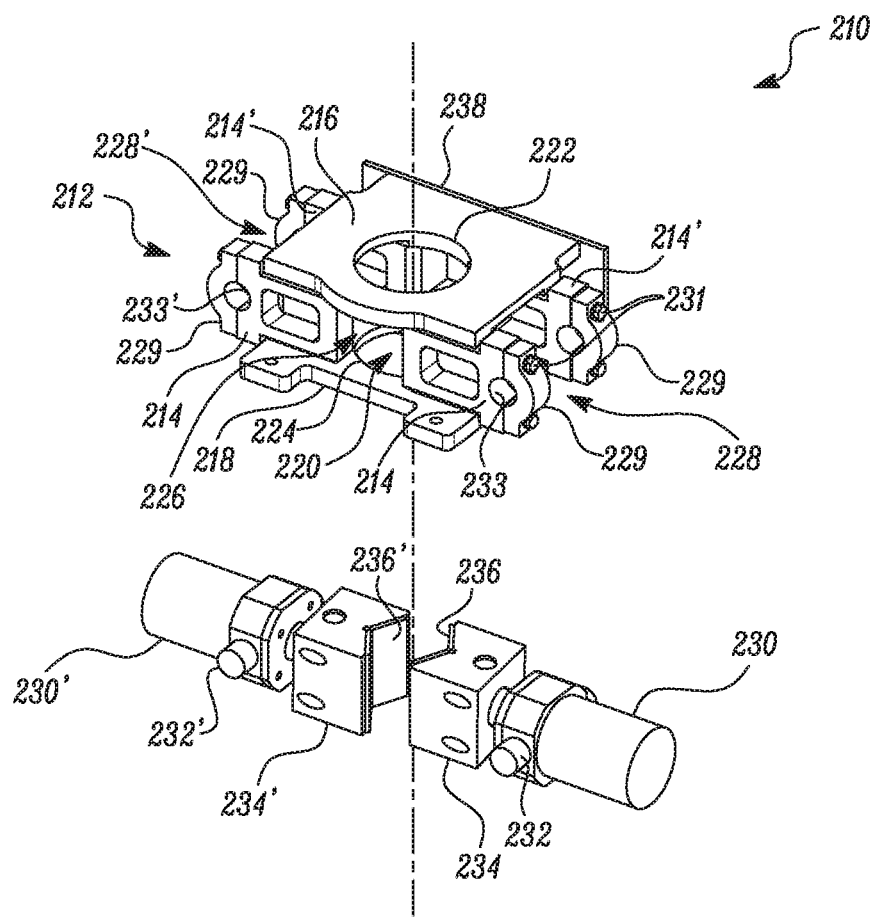
FIG. 4 is an exploded view of a first clamping mechanism of the system, in accordance with an embodiment of the disclosure.

Referring to FIG. 4, the first clamping mechanism 210 is shown. The first clamping mechanism 210 may be disposed above the hammer centralizer 170, the pipe centralizer 180, and the drill pick up pot 190 of the machine 100. The first clamping mechanism 210 includes a first frame 212. The first frame 212 includes a pair of first lateral sides 214 and a pair of second lateral sides 214'. The pair of first lateral sides 214 is disposed spaced apart from the pair of second lateral sides 214'. The first frame 212 further includes an upper plate 216 and a lower plate 218, each of the upper plate 216 and the lower plate 218 being coupled to the pair of first lateral sides 214 and the pair of second lateral sides 214' to form a cavity 220 therebetween. Each of the pair of first lateral sides 214, the pair of second lateral sides 214', the upper plate 216 and the lower plate 218 may be coupled or joined to each other by way of any suitable means, such as by welding, adhesives, or fastening member, for example riveting, nut and bolt, or the like. Each of the upper plate 216 and the lower plate 218 may define an opening 222, 224— the opening 222 being coaxial with the opening 224. The size of the openings 222, 224 may be such so as to facilitate the one or more columns 154 and the drill bit 152 of the drill assembly 150 to pass therethrough. As shown in FIG. 4, the pair of first lateral sides 214 further define a gap 226 between the pair of first lateral sides 214. The gap 226 may allow the interfaces 160, 160' formed between the one or more columns 154 and between the lowermost column 154' and the drill bit 152 to be visible when the one or more columns 154 and/or the drill bit 152 is disposed (at least partially) within the cavity 220.

The first clamping mechanism 210 further includes two first clamp actuators 230, 230'. The first clamp actuators 230, 230' may be coupled with the first frame 212 between lateral openings 228, 228' defined between the pair of first lateral sides 214 and the pair of second lateral sides 214'. In alternate embodiments, the first clamping mechanism 210 may only include one first clamp actuator, and may omit another first clamp actuator of two first clamp actuators 230, 230'. In an embodiment as shown in FIG. 4, in which the first clamping mechanism 210 includes two first clamp actuators 230, 230', the two actuators 230, 230' may be coupled with the first frame 212 at the two opposite lateral openings 228, 228' formed between the pair of first lateral sides 214 and the pair of second lateral sides 214'. The first clamp actuators 230, 230' may include stubs 232, 232' which are adapted to be received into grooves 233, 233' formed in the pair of first lateral sides 214 and the pair of second lateral sides 214' to couple the first clamp actuators 230, 230' with the first frame 212. Further, a C-clip 229 and nut and bolt arrangement 231 may be used to secure the stubs 232, 232' into the grooves 233, 233'. The first clamp actuators 230, 230' may include an actuator from any category of the actuators, such as mechanical, electrical, electromechanical, hydraulic, or the like.

The first clamping mechanism 210 further includes a pair of first clamping jaws 234, 234'. The first clamping jaw 234 may be operatively coupled with the first clamp actuator 230, while the first clamping jaw 234' may be operatively coupled with the first clamp actuator 230' and may be received within the cavity 220 of the first frame 212. The pair of first clamping jaws 234, 234' may be adapted to be movable towards each other by the first clamp actuators 230, 230' to engage with one or more columns 154 or the drill bit 152 of the drill assembly 150. In an embodiment, the first clamping mechanism 210 or the pair of first clamping jaws 234, 234' is adapted to engage with any one of the first column 156 or the drill bit 152. The first clamping mechanism 210 may further include first wear pads 236, 236'. The first wear pads 236, 236' may be coupled to the pair of first clamping jaws 234, 234' for providing grip to the first clamping jaws 234, 234' to engage with the one or more columns 154 (or the first column 156) or the drill bit 152 of the drill assembly 150.

The first clamping mechanism 210 includes a backplate 238 (as shown in FIG. 2 also). The backplate 238 is coupled to the pair of second lateral sides 214' of the first frame 212 via any coupling or fastening members, for example nuts and bolts, screws, rivets, etc. The first clamping mechanism 210 further includes a pair of track bars 240 (as shown in FIG. 2) formed on the backplate 238. The track bars 240 may be in sliding contact with the supporting rails 118 of the mast 112. The backplate 238 and the track bars 240 may facilitate sliding movement of the first clamping mechanism 210 relative to the mast 112 and/or the drill assembly 150, along the longitudinal axis X-X.

Figure 5:
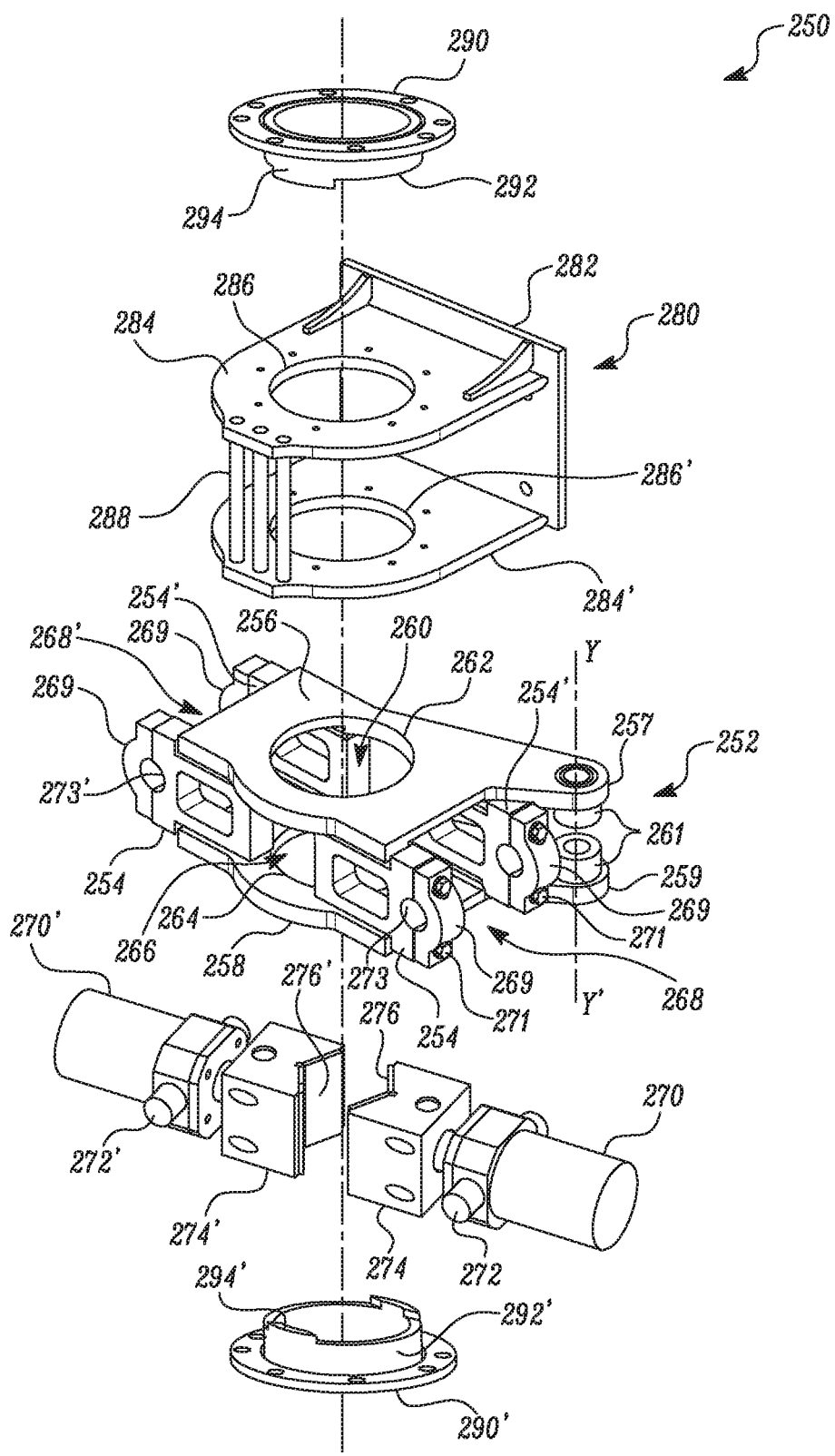
FIG. 5 is an exploded view of a second clamping mechanism of the system, in accordance with an embodiment of the disclosure.

Referring to FIG. 5, the second clamping mechanism 250 is shown. The second clamping mechanism 250 may be disposed above the first clamping mechanism 210. Unlike the first clamping mechanism 210, the second clamping mechanism 250 may be immovable relative to the supporting rails 118 of the mast 112 (details discussed later). The second clamping mechanism 250 includes a second frame 252. The second frame 252 includes a pair of first lateral sides 254 and a pair of second lateral sides 254'. The pair of first lateral sides 254 is disposed spaced apart from the pair of second lateral sides 254'. The second frame 252 further includes an upper plate 256 and a lower plate 258, each of the upper plate 256 and the lower plate 258 being coupled to the pair of first lateral sides 254 and the pair of second lateral sides 254' to form a cavity 260 therebetween. Each of the pair of first lateral sides 254, the pair of second lateral sides 254', the upper plate 256 and the lower plate 258 may be coupled or joined to each other by way of any suitable means, such as by welding, adhesives, or fastening member, for example riveting, nut and bolt, or the like. Each of the upper plate 256 and the lower plate 258 define an opening 262, 264—the opening 262 being coaxial with the opening 264. The size of the openings 262, 264 may be such so as to facilitate the one or more columns 154 and the drill bit 152 of the drill assembly 150 to pass therethrough. As shown in FIG. 5, the pair of first lateral sides 254 further define a gap 266 between the pair of first lateral sides 254. The gap 266 may allow the interfaces 160, 160' formed between the one or more columns 154 and between the lowermost column 154' and the drill bit 152 to be visible when the one or more columns 154 and/or the drill bit 152 is disposed within the cavity 260.

The second clamping mechanism 250 further includes two second clamp actuators 270, 270'. The second clamp actuators 270, 270' may be coupled with the second frame 252 between lateral openings 268, 268' defined between the pair of first lateral sides 254 and the pair of second lateral sides 254'. In alternate embodiments, the second clamping mechanism 250 may only include one second clamp actuator, and may omit another second clamp actuator of two clamp second actuators 270, 270'. In an embodiment as shown in FIG. 5, in which the second clamping mechanism 250 includes two second clamp actuators 270, 270', the two second clamp actuators 270, 270' may be coupled with the second frame 252 at the two opposite lateral openings 268, 268' formed between the pair of first lateral sides 254 and the pair of second lateral sides 254'. The second clamp actuators 270, 270' may include stubs 272, 272' which are adapted to be received into grooves 273, 273' formed in the pair of first lateral sides 254 and the pair od second lateral sides 254' to couple the second clamp actuators 270, 270' with the second frame 252. Further, a C-clip 269 and nut and bolt arrangement 271 may be used to secure the stubs 272, 272' into the grooves 273, 273'. The second clamp actuators 270, 270' may include an actuator from any category of the actuators, such as mechanical, electrical, electromechanical, hydraulic, or the like.

The second clamping mechanism 250 further includes a pair of second clamping jaws 274, 274'. The second clamping jaw 274 may be operatively coupled with the second clamp actuator 270, while the second clamping jaw 274' may be operatively coupled with the second clamp actuator 270' and may be received within the cavity 260 of the second frame 252. The pair of second clamping jaws 274, 274' may be adapted to be movable towards each other by the second clamp actuators 270, 270' to engage with one or more columns 154 or the drill bit 152 of the drill assembly 150. In an embodiment, the second clamping mechanism 250 or the pair of second clamping jaws 274, 274' is adapted to engage with the second column 158. The second clamping mechanism 250 may further include second wear pads 276, 276'. The second wear pads 276, 276' may be coupled to the pair of second clamping jaws 274, 274' for providing grip to the second clamping jaws 274, 274' to engage with the one or more columns 154 (or the second column 158) of the drill assembly 150.

The second clamping mechanism 250 further includes a third frame 280. The third frame 280 is a U-shaped structure formed of a first plate 282 and a pair of second plates 284, 284'. The second plates 284, 284' are disposed spaced apart from each other and are coupled to the first plate 282 to form the U-shaped structure. The pair of second plates 284, 284' includes respective openings 286, 286' formed in each plate of the pair of second plates 284,284'. The opening 286 is coaxial with the opening 286', and both the openings 286, 286' are further coaxial with the openings 262, 264 of the second frame 252, when both the second frame 252 and the third frame 280 are assembled with the mast 112. The size of the openings 286, 286' may be such so as to facilitate the one or more columns 154 and the drill bit 152 of the drill assembly 150 to pass therethrough. The third frame 280 may further include support bars 288, one end of which is coupled to the second plate 284, while another end is coupled to the pair of second plate 284'. The support bars 288 may provide strength to the third frame 280 and prevent deformation of the third frame 280 during assembly and operation of the system 200.

The second clamping mechanism 250 further includes a pair of bearings 290, 290'. The bearings 290, 290' are coupled to the third frame 280 at the second plates 284, 284', respectively. For example, the bearing 290 may be coupled with the second plate 284, while the bearing 290' may be coupled with the second plate 284'. Each bearing 290, 290' includes a cylindrical sleeve 292, 292' having a protrusion 294, 294' formed along a portion of the cylindrical sleeve 292, 292'. The cylindrical sleeve 292, 292' and the protrusion 294, 294' may rotatably couple the second frame 252 with the third frame 280 about an axis that commonly passes through the openings 262, 264 and the openings 286, 286'. Such an axis may fall in line or may be one and the same as the longitudinal axis X-X'.

Further, the third frame 280 may be coupled to the mast 112 by means of fastening members 296 driven through the plate 282 and engaged with a portion of the mast 112, as may be visualized in FIG. 2. The fastening members 296 may include screws, nut and bolts, rivets, studs, or the like.

As shown in FIG. 3, in assembly of the system 200, the openings 222, 224 of the first frame 212, the openings 262, 264 of the second frame 252, and the openings 286, 286' of the third frame 280 may be coaxial with each other, when both the first clamping mechanism 210 and the second clamping mechanism 250 are assembled with the mast 112, to facilitate the one or more columns 154 and the drill bit 152 of the drill assembly 150 to pass therethrough. Further, it should be contemplated that the openings 222, 224, 262, 264, 286, 286' may be coaxial with openings of the hammer centralizer 170, pipe centralizer 180 and the drill pick up pot 190 to facilitate the one or more columns 154 and the drill bit 152 of the drill assembly 150 to pass therethrough.

The second clamping mechanism 250 further includes a second actuator 298, as shown in FIG. 3. The second actuator 298 may include a cylinder 297 and a rod 299 extending from the cylinder 297 and retractable along the cylinder 297. One end of the second actuator 298 may be coupled to the mast 112 of the machine 100, while another end of the second actuator 298 may be coupled to the second frame 252. In the embodiment shown in FIG. 3, the cylinder 297 is pivotably coupled to the mast 112 of the machine 100, while the rod 299 is pivotably coupled to the second frame 252 at extended portions 257 and 259 of the upper plate 256 and the lower plate 258, to allow rotation of the rod 299 relative to the second frame 252 about an axis Y-Y'. Each of the extended portions 257, 259 may include cylindrical bushes 261 extending towards each other. The cylindrical bushes 261 may be adapted to couple with the rod 299 of the second actuator 298. In operation, a retraction or extension of the rod 299 relative to the cylinder 297 may provide for a turning movement of the second frame 252 relative to the third frame 280 about the longitudinal axis X-X'. The second actuator 298 may include an actuator from any category of the actuators, such as mechanical, electrical, electromechanical, hydraulic, or the like, which can be adapted to turn the second clamping mechanism 250 relative to the first clamping mechanism 210.

Figure 6:
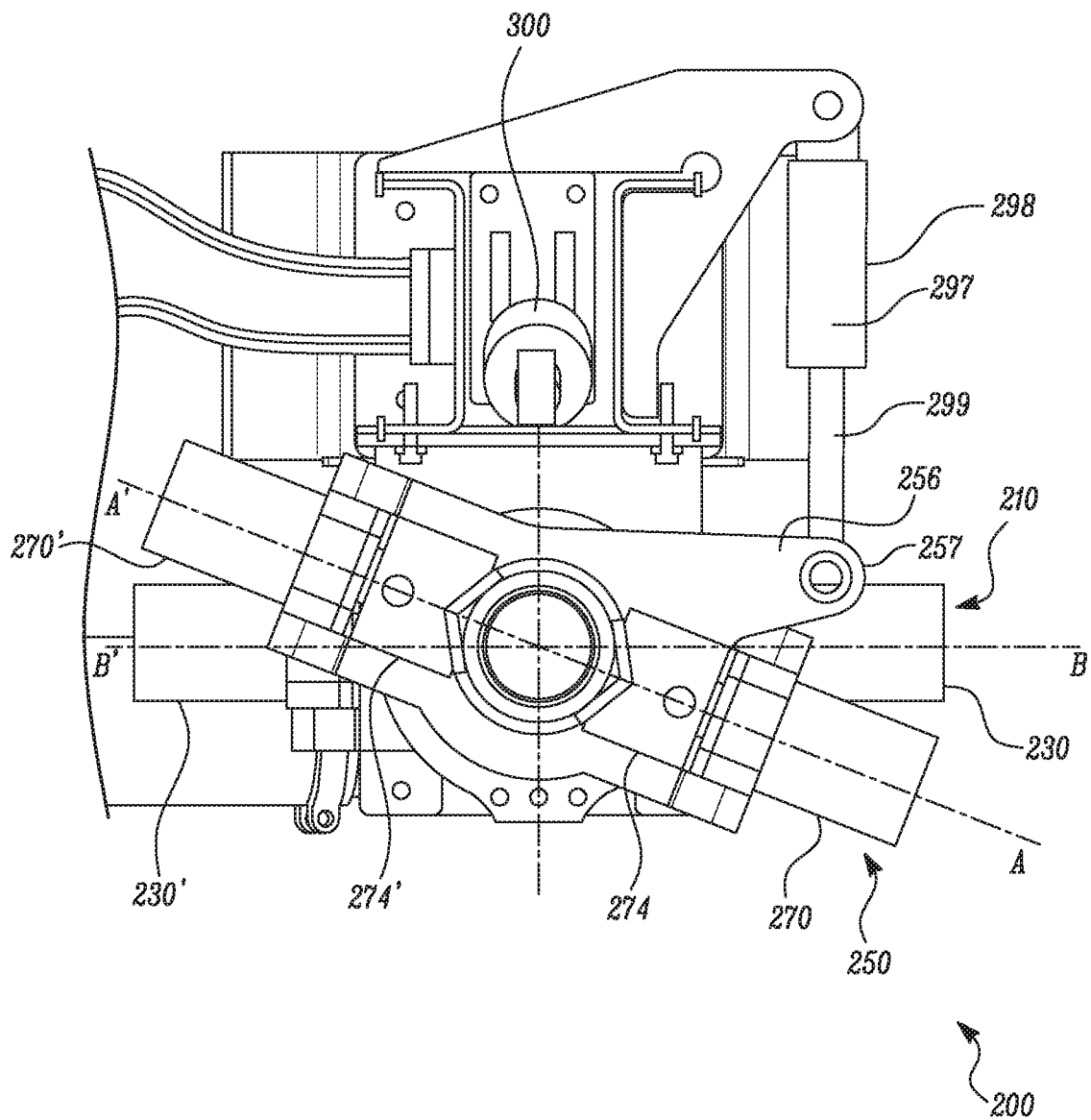
FIG. 6 is a top view of the system illustrating an operative configuration of the second clamping mechanism relative to the first clamping mechanism for disassembling the drill assembly, in accordance with an embodiment of the present disclosure.

Referring to FIG. 6, which illustrates a top view of the system 200, the turning movement of the second frame 252 relative to the third frame 280, by the second actuator 298, may be explained as the movement of the second frame 252 from a first position to a second position. The first position of the second frame 252 corresponds to a position in which an axis A-A', passing through centers of the second clamp actuators 270, 270', of the second frame 252 is at an angular displacement with respect to an axis B-B', passing through centers of the first clamp actuators 230, 230', of the first frame 212, however, the second position of the second frame 252 corresponds to a position in which the angular displacement between the axis A-A' of the second frame 252 and the axis B-B' of the first frame 212 is 0 degree.

In an embodiment, in which the first clamping mechanism 210 is engaged with one of the drill bit 152 or the first column 156 of the drill assembly 150, and the second clamping mechanism 250 is engaged with the second column 158 successive to the drill bit 152 or to the first column 156, the second actuator 298 may be adapted to turn the second clamping mechanism 250 relative to the first clamping mechanism 210 to at least partially delink the second column 158 from the first column 156 or the drill bit 152. In some embodiments, a threaded connection between the second column 158 and the first column 156 or the drill bit 152 may be a relatively short-twist connection, allowing the second actuator 298 to fully delink the second column 158 from the first column 156 or the drill bit 152.

The first actuator 300, as shown in FIG. 2, includes a first end 302 and a second end 304. The first end 302 of the first actuator 300 is coupled to the mast 112 of the machine 100 via fastening members 306, while the second end 304 of the first actuator 300 is coupled to the first clamping mechanism 210. In the embodiment shown, the second end 304 of the first actuator 300 is coupled to the back plate 238. The first actuator 300 includes a cylinder 310 and a rod 312 extending from the cylinder 310. The rod 312 is retractably coupled with the cylinder 310, that is to say, the rod 312 may extend from the cylinder 310 and the rod 312 may retract into the cylinder 310 upon actuation of the cylinder 310. The first actuator 300 may be adapted to move the first clamping mechanism 210 relative to the second clamping mechanism 250 along the longitudinal axis X-X'. In an embodiment, the first actuator 300 is adapted to move the first clamping mechanism 210 relative to the second clamping mechanism 250 by slidingly engaging the track bars 240 of the back plate 238 on the supporting rails 118 of the mast 112.

Movement of the first clamping mechanism 210 relative to the second clamping mechanism 250 may define a gap 308 between the first clamping mechanism 210 and the second clamping mechanism 250, along the longitudinal axis X-X'. The gap 308 defined between the first clamping mechanism 210 and the second clamping mechanism 250 may reveal the interfaces 160, 160' formed between the one or more columns 154 and between the lowermost column 154' and the drill bit 152. The first actuator 300 may include an actuator from any category of the actuators, such as mechanical, electrical, electromechanical, hydraulic, or the like, which can be adapted to move the first clamping mechanism 210 relative to the second clamping mechanism 250.

In the embodiment disclosed, since the first clamping mechanism 210 is disposed above the hammer centralizer 170, the pipe centralizer 180 and the drill pick up pot 190, it can be contemplated that the movement of the first clamping mechanism 210 relative to the second clamping mechanism 250, by the first actuator 300, shall cause the move the movement of the hammer centralizer 170, the pipe centralizer 180 and the drill pick up pot 190 with the first clamping mechanism 210.

Referring to FIG. 7, the system 200 for disassembling the drill assembly 150 further include a third actuator 350 and a drive mechanism 360. The third actuator 350 and the drive mechanism 360 may be coupled to each other via a drive plate 352. In an embodiment, the third actuator 350 is coupled to the drive plate 352 at one side of the drive plate 352, and the drive mechanism 360 is coupled to the drive plate 352 at another side of the drive plate 352. The drive plate 352 may further include one or more track bars (not shown) (similar to track bars 240) adapted to engage with the supporting rails 118 of the mast 112.

The third actuator 350 may further include a drill motor 354 and an adapter 356 operatively coupled to the drill motor 354. The adapter 356 may be adapted to engage with the columns 154 of the drill assembly 150. In an embodiment, the adapter 356 is adapted to engage with the second column 158 of the drill assembly 150. The adapter 356, in addition to being adapted to be coupled (by any suitable and known connection mechanism, e.g., threaded connection mechanism) to the second column 158 of the drill assembly 150, may be driven by the drill motor 354 to turn the second column 158 relative to the first column 156 or the drill bit 152 for fully delinking the second column 158 from the first column 156 or the drill bit 152.

The drive mechanism 360 may be adapted to power a movement of the drive plate 352 and the third actuator 350 upwards along the longitudinal axis X-X' via a slidable engagement between the supporting rails 118 and the track bars of the drive plate 352. The drive mechanism 360 may include a motor 362 and a chain 363 and sprocket 364 mechanism (as shown in FIG. 1) driven by the motor 362. In an embodiment, the chain of the drive mechanism 360 is connected to the drive plate 352, as shown in FIG. 1, and the motor 362 is able to power a slide of the drive plate 352 on the supporting rails 118 of the mast 112, thereby moving the drive plate 352 and/or the drill assembly 150 along the longitudinal axis X-X'.

INDUSTRIAL APPLICABILITY

During a drilling operation, the interlinked columns 154 may be inserted into the borehole 106 to advance and extend the drill bit 152 into the borehole 106. Once the drilling operation is performed, it may be required for the interlinked columns 154 to be moved out of the borehole 106. Referring to FIG. 16, an exemplary method 1600 for disassembling the drill assembly 150 is disclosed. The method 1600 is discussed in conjunction with FIGS. 7-15 and is discussed by way of a flowchart provided in FIG. 16.

Figure 8:
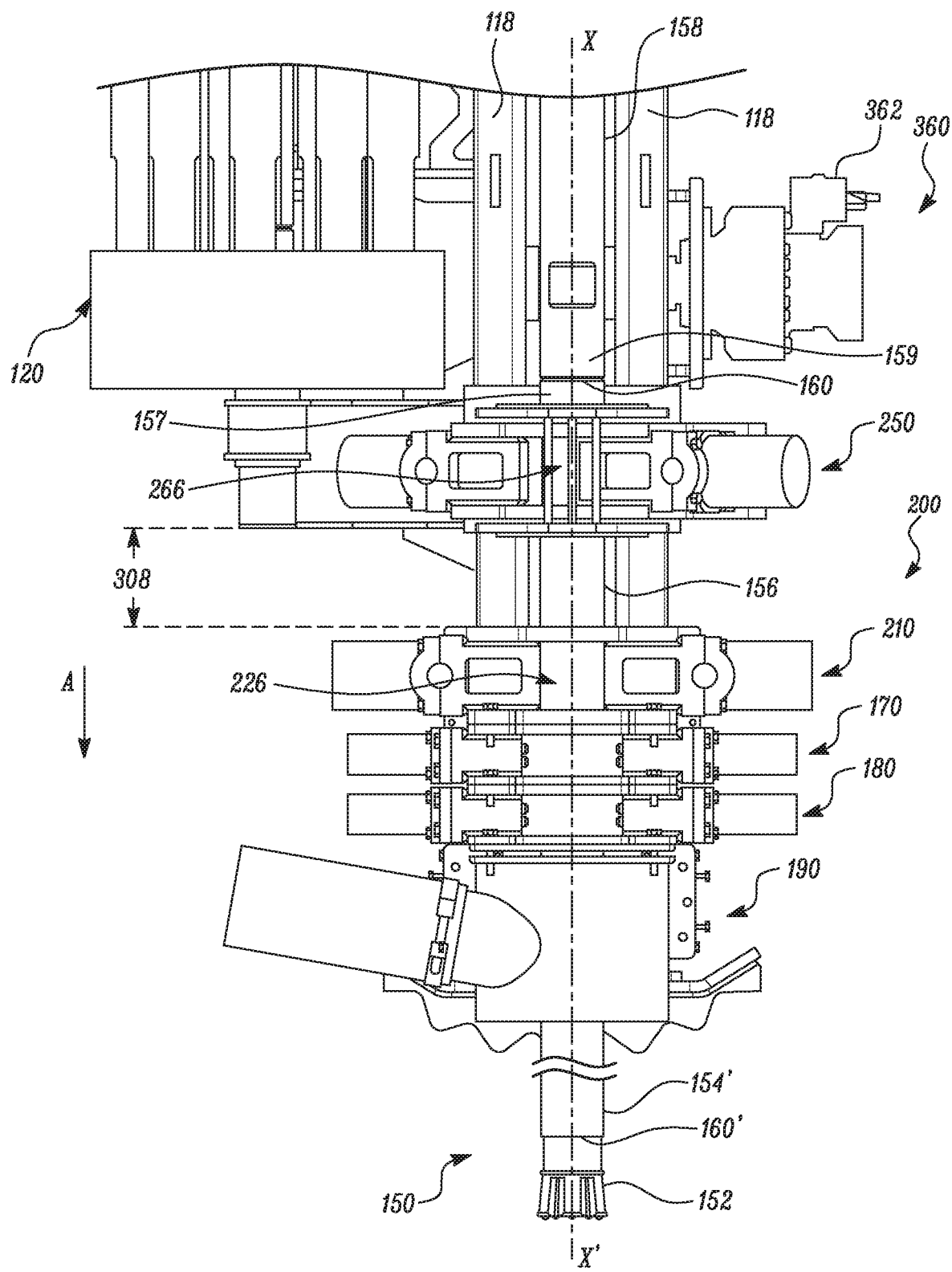

To disassemble the drill assembly 150, using the system 200, the method 1600 includes engaging the adapter 356 (or the third actuator 350) to the second column 158 to be delinked/disassembled from the first column 156 or the drill bit 152. The method 1600, at Step 1602, also as shown in FIG. 8, includes moving, by the first actuator 300, one of the first clamping mechanism 210 or the second clamping mechanism 250 relative to the other of the first clamping mechanism 210 or the second clamping mechanism 250. For example, the method 1600 includes moving, by the first actuator 300, the first clamping mechanism 210 relative to the second clamping mechanism 250 (see arrow, A). In so doing, the gap 308 is defined between the first clamping mechanism 210 and the second clamping mechanism 250 to reveal the interface 160 between the first column 156 and the second column 158 for delinking the second column 158 from the first column 156.

Figure 9:
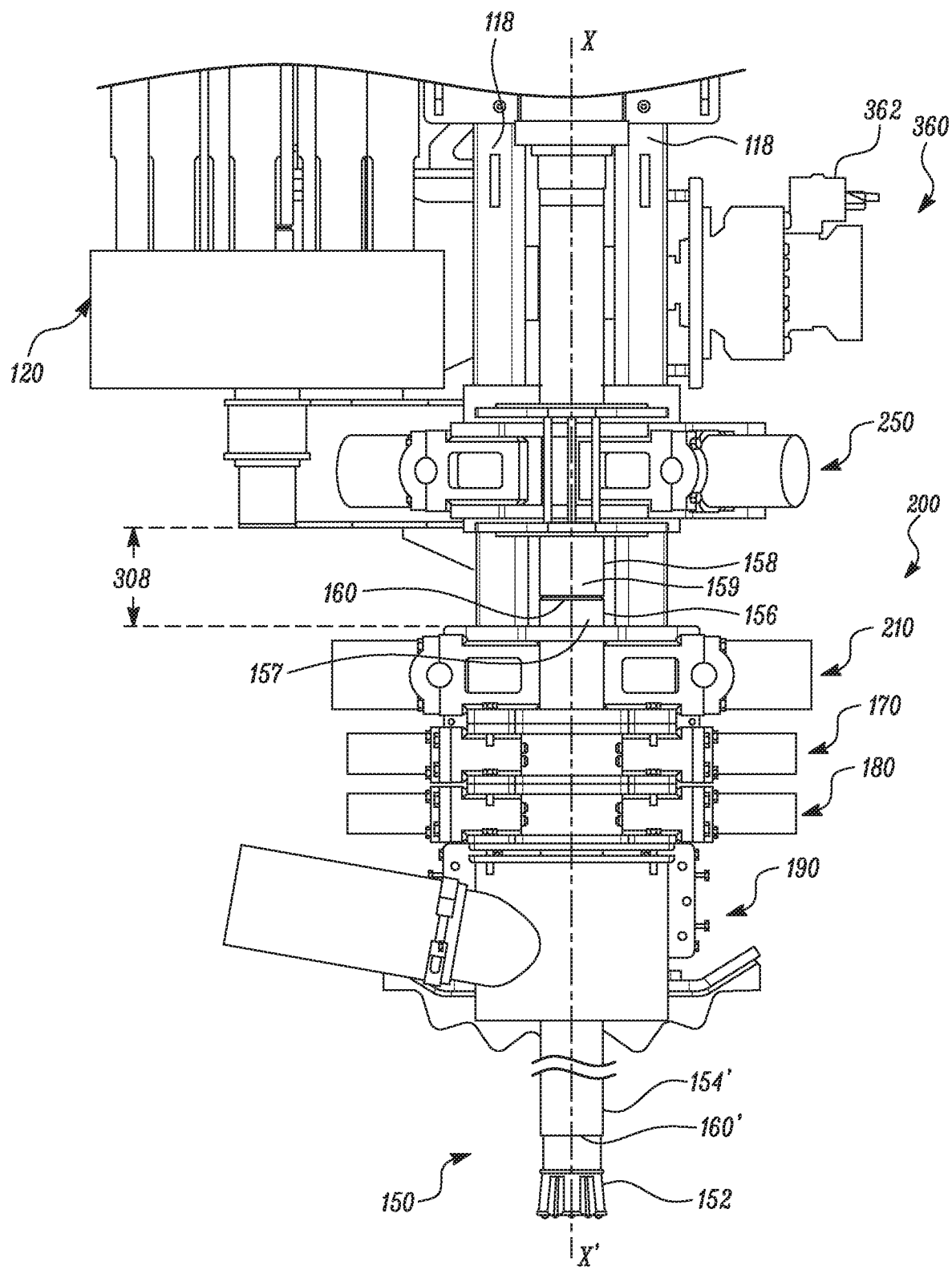
Figure 10:
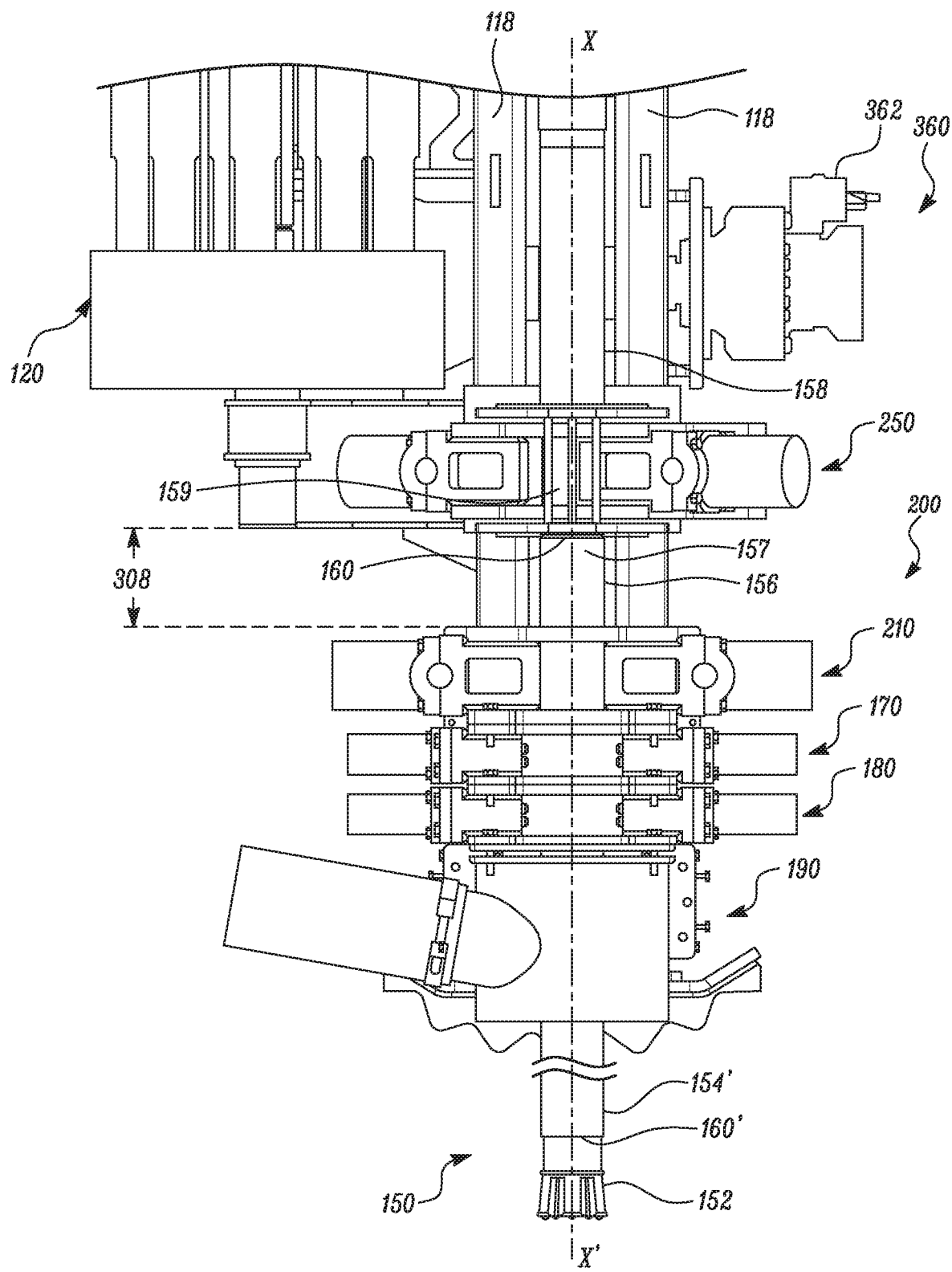
Figure 11:
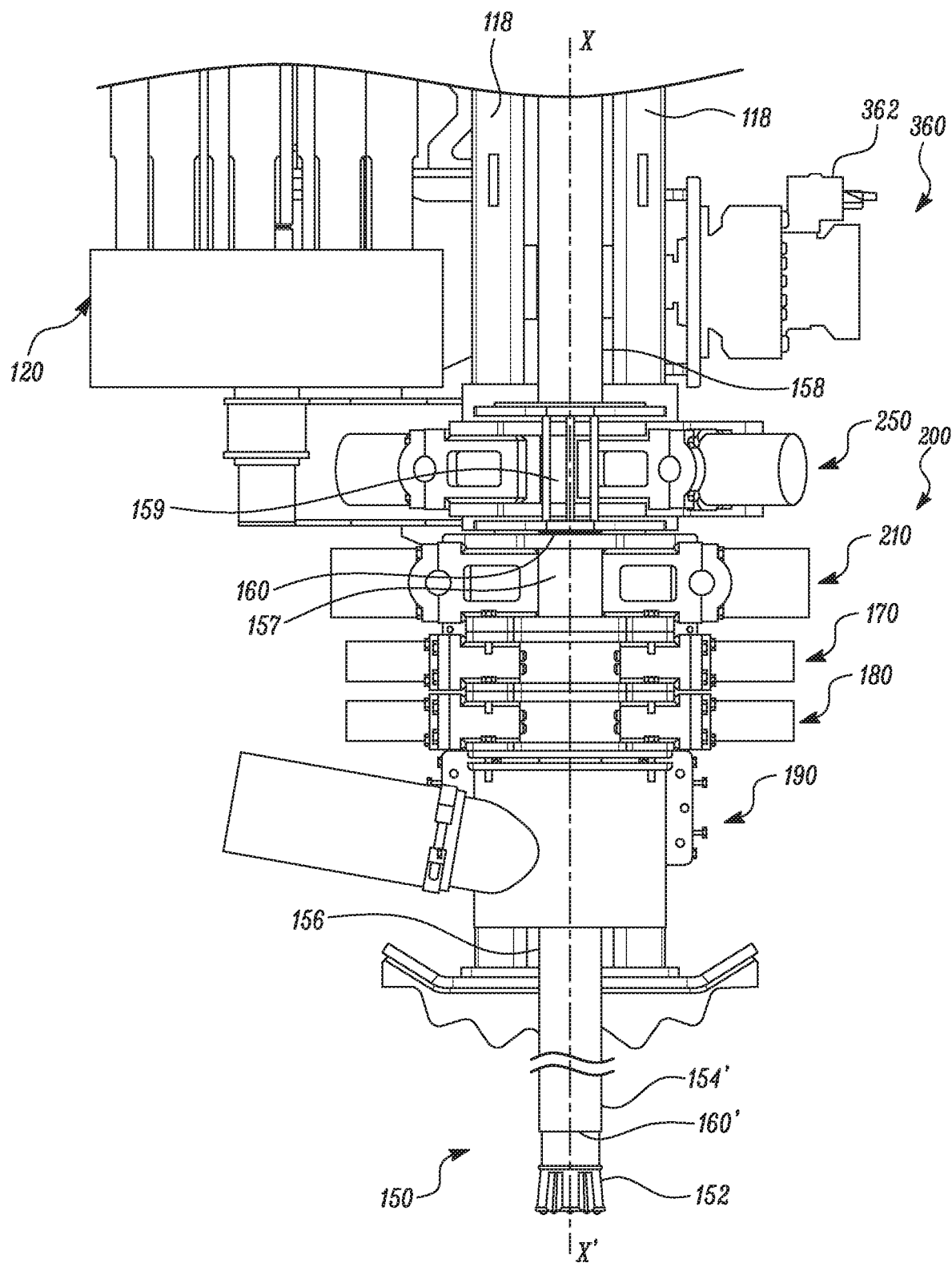

Since the adapter 356 (or the third actuator 350) is coupled to the second column 158, the method 1600 further includes moving the drill assembly 150 upwards along the longitudinal axis X-X', via the drive mechanism 360, to locate the interface 160 between the first clamping mechanism 210 and the second clamping mechanism 250, as shown in FIG. 9, through the gap 308. The method 1600 thereafter includes positioning the interface 160 between the gap 308 defined between first clamping mechanism 210 and the second clamping mechanism 250, such that an end portion 159 of the second column 158 proximal to the interface 160 is disposed in the cavity 260 of the second clamping mechanism 250 (or the second frame 252), as shown in FIG. 10. The method 1600 then includes moving, by the first actuator 300, the first clamping mechanism 210 along the longitudinal axis X-X', such that an end portion 157 (see FIG. 11) of the first column 156 proximal to the interface 160 is disposed in the cavity 220 of the first clamping mechanism 210 (or the first frame 212), as shown in FIG. 11.

Figure 12:
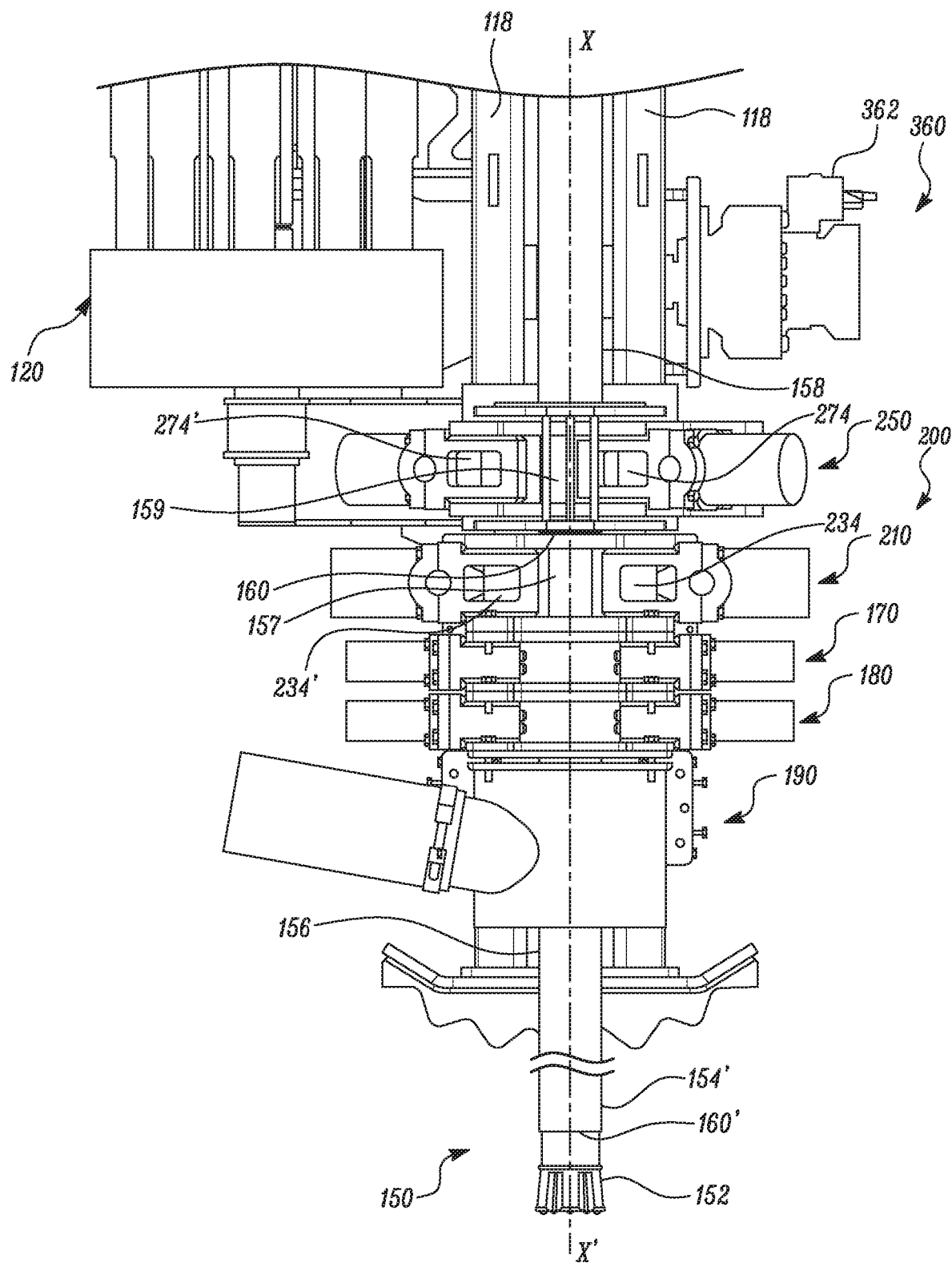

Referring now to FIG. 12, the method 1600, at Step 1604, includes engaging one of the drill bit 152 or the first column 156 by the first clamping mechanism 210. For example, the method 1600 include engaging the first column 156 with the first clamping mechanism 210. Such engagement may be facilitated by the first clamping jaws 234, 234' when being actuated by the first clamp actuators 230, 230' to move towards each other. At Step 1606, the method 1600 includes engaging the second column 158 by the second clamping mechanism 250. Such engagement may be facilitated by the second clamping jaws 274, 274' when being actuated by the second clamp actuators 270, 270' to move towards each other.

Figure 13:
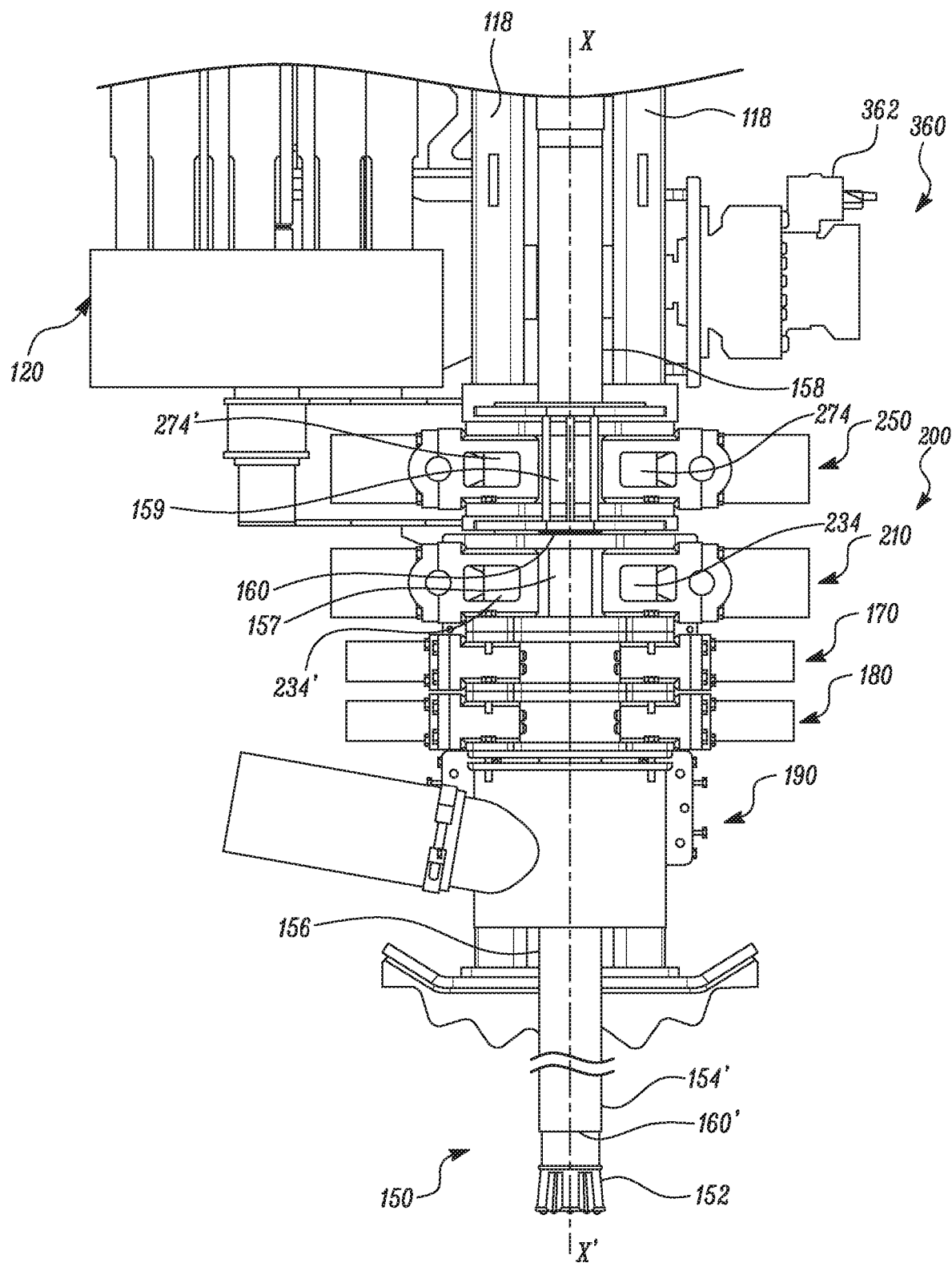

The method thereafter, at Step 1608, and as shown in FIG. 13, includes turning, by the second actuator 298, the second clamping mechanism 250 relative to the first clamping mechanism 210 to at least partially delink the second column 158 from the first column 156. As explained above, in one embodiment, the second actuator 298 may be adapted to partially delink the second column 158 from the first column 156 or the drill bit 152, while in another embodiment, the second actuator 298 may be adapted to fully delink the second column 158 from the first column 156 or the drill bit 152. However, in embodiments, where turning, by the second actuator 298, the second clamping mechanism 250 relative to the first clamping mechanism 210 partially delinks the second column 158 from the first column 156, the method 1600 may include turning the second column 158 with the third actuator 350 to fully delink the second column 158 from the first column 156.

Figure 14:
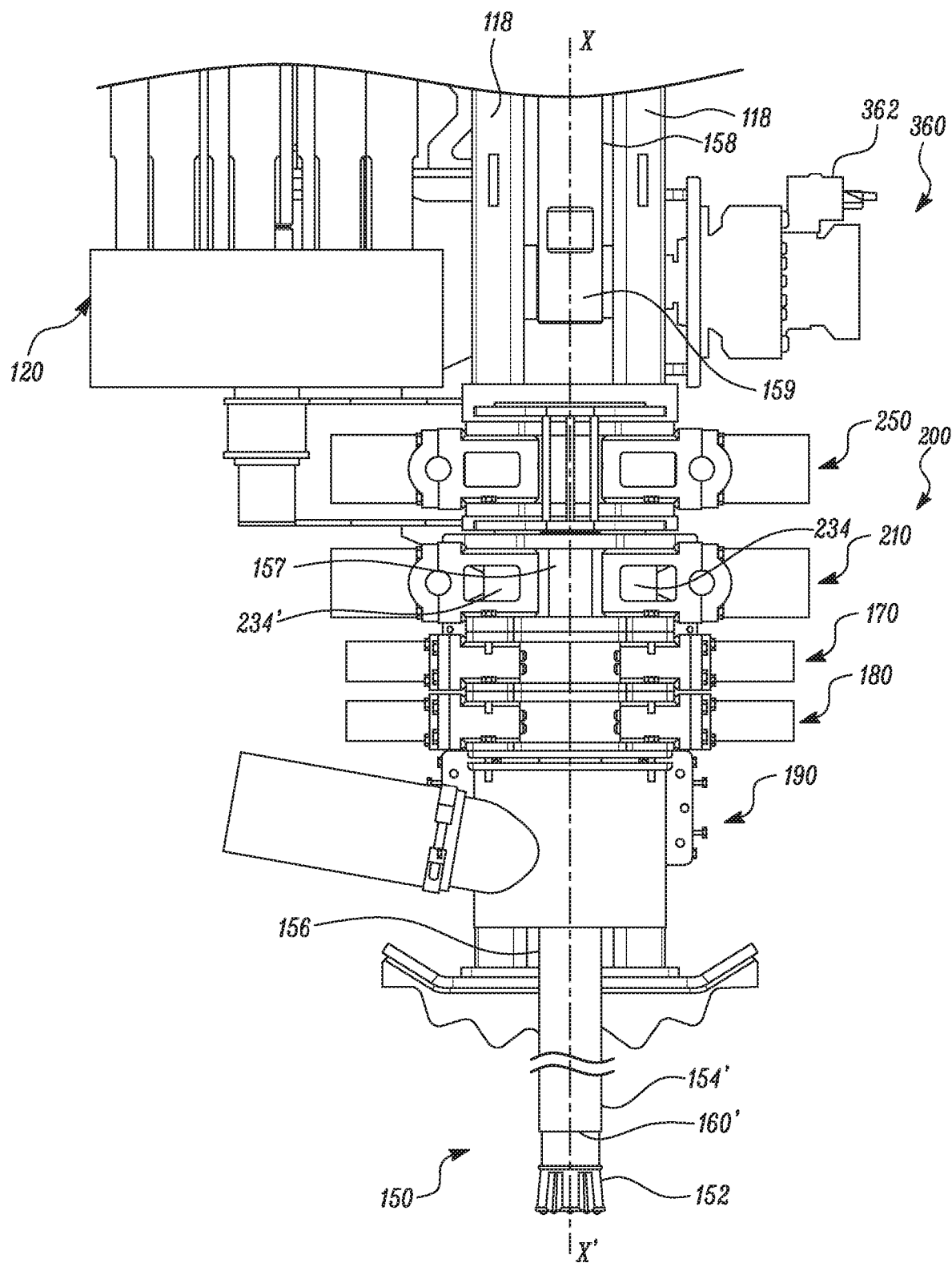

When the second column 158 has been fully delinked from the first column 156, the method 1600 may include moving the second column 158, via the adapter 356 and the drive mechanism 360, along the longitudinal axis X-X', as shown in FIG. 14, and transferring the removed second column 158 into the carousel 120 (e.g., manually). Thereafter, the drive mechanism 360 may lower the adapter 356 (or the third actuator 350) to engage with the next column 154 (e.g., first column 156) to be delinked/disassembled from the drill assembly 150 (or the drill bit 152).

When it is required to delink the drill bit 152 from the first column 156 using the system 200 of the disclosure. The method 1600, at step 1602, includes moving, by the first actuator 300, the first clamping mechanism 210 or the second clamping mechanism 250 relative to the other of the first clamping mechanism 210 or the second clamping mechanism 250. In an embodiment, the method 1600 includes moving the first clamping mechanism 210 relative to the second clamping mechanism 250 (see arrow, A). The relative movement of the first clamping mechanism 210 and the second clamping mechanism 250 defines the gap 308 between the first clamping mechanism 210 and the second clamping mechanism 250 to reveal the interface 160' between the drill bit 152 and the first column 156 for delinking the first column 156 from the drill bit 152.

Figure 15:
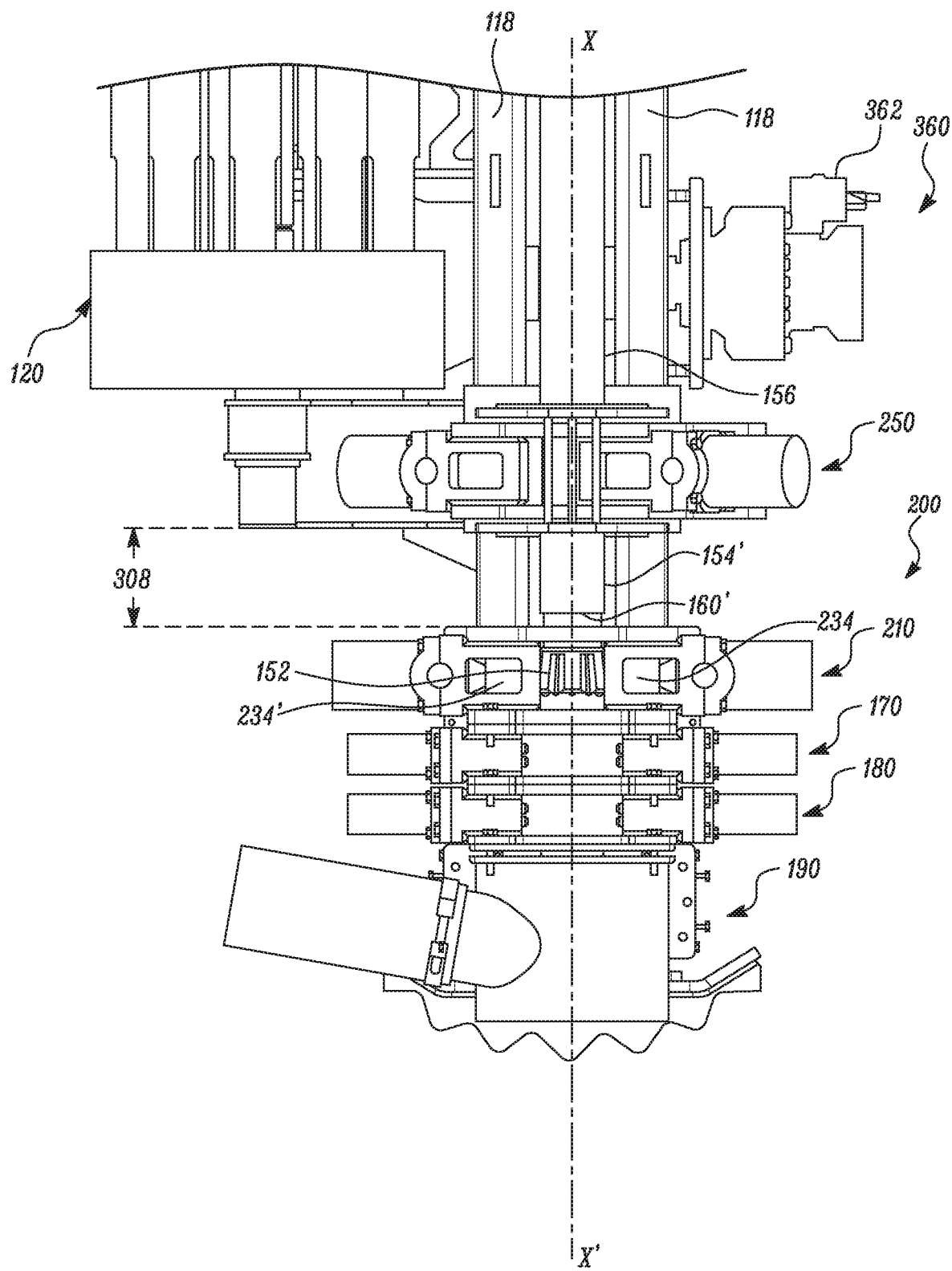
Figure 16:
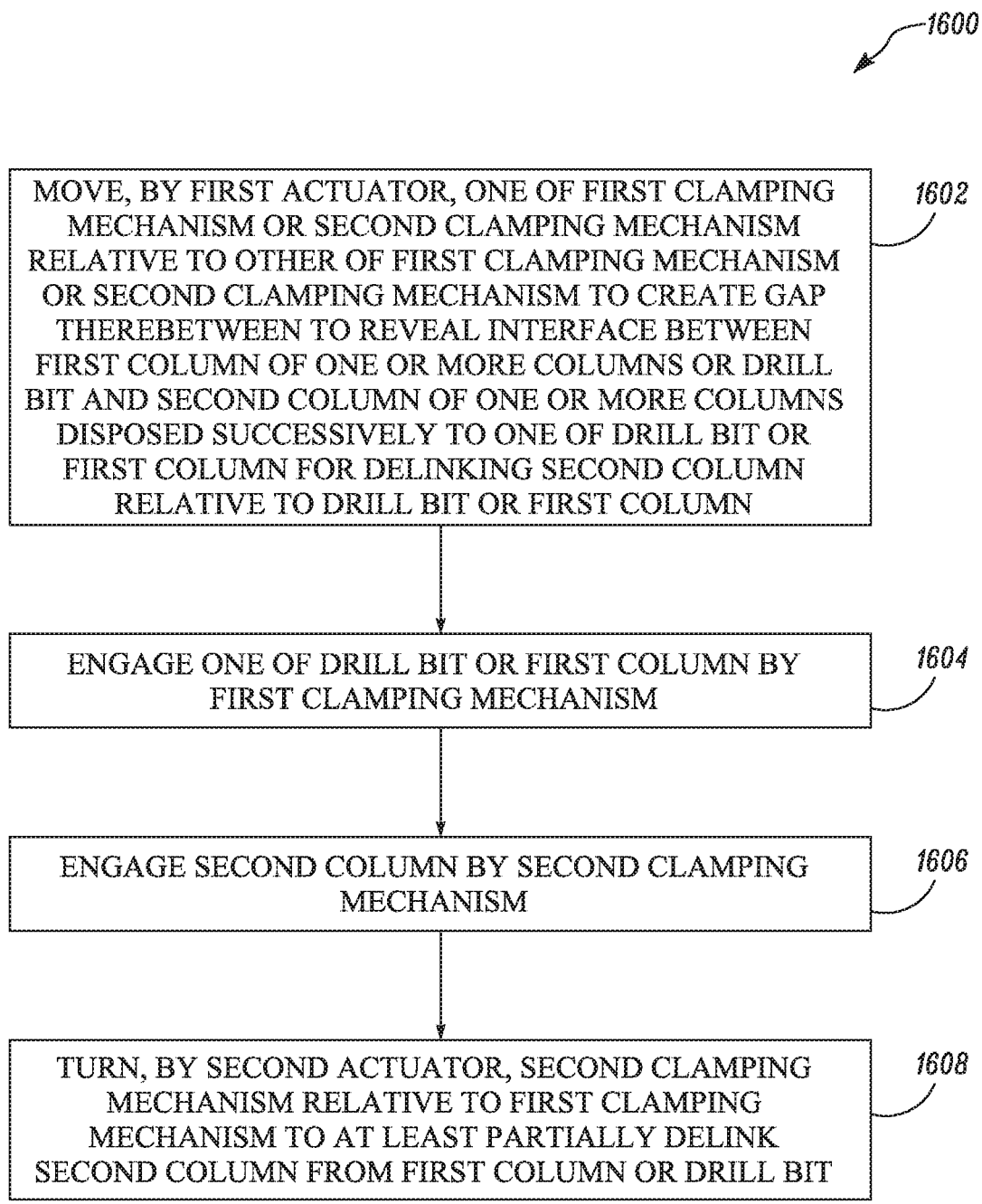
FIG. 16 is a flow chart depicting an exemplary method for disassembling the drill assembly, in accordance with an embodiment of the present disclosure.

Referring now to FIG. 15, the method 1600, at Step 1604, includes engaging the drill bit 152 by the first clamping mechanism 210, and, at Step 1606, engaging the first column 156 by the second clamping mechanism 250 in the same/similar manner by which the second column 158 and the first column 156 were coupled at Step 1604 and 1606.

The method 1600 then at Step 1608 includes turning, by the second actuator 298, the second clamping mechanism 250 relative to the first clamping mechanism 210 to at least partially delink the second column 158 from the drill bit 152.

It should be contemplated that, there may exist a case in which a process of removing the drill bit 152 from the first column 156 may cause the drill bit 152 to fall into the borehole 106. To avoid falling of the drill bit 152 into the borehole 106, the method 1600 may further include varying, using the mast shift cylinder 116, the position of the mast 112 from a vertical position to a horizontal or inclined position (not shown) to facilitate changing or replacing the drill bit 152 of the drill assembly 150.

The system 200 and the method 1600 for disassembling the drill assembly 150 may provide easy and safe delinking or disassembly of the columns 154 and the drill bit 152 of the drill assembly 150. Also, the system 200 and the method 1600 may reduce time required for repairing or replacing a drill bit of a drill assembly.

Having shown and described preferred embodiments, those skilled in the art will realize that many variations and modifications may be made to affect the described disclosure and still be within the scope of the present disclosure. Additionally, many of the elements indicated above may be altered or replaced by different elements which will provide the same result and fall within the spirit of the disclosure. It is the intention, therefore, to limit the scope of the disclosure only as indicated by the scope of the claims.

What is claimed is:

1. A system for disassembling a drill assembly, the drill assembly including a drill bit and one or more columns directly interlinked with each other at interfaces defining breakout regions, the one or more columns adapted to extend the drill bit into a borehole defined through a surface, the system comprising:
   a first clamping mechanism adapted to engage one of the drill bit or a first column of the one or more columns;
   a second clamping mechanism adapted to engage a second column of the one or more columns, the second column being disposed successively to one of the drill bit or the first column, the second clamping mechanism adapted to be turned relative to the first clamping mechanism to at least partially delink the second column from the first column or the drill bit;
   a first actuator adapted to move the first clamping mechanism parallel to a longitudinal axis of the drill assembly relative to the second clamping mechanism to define a gap therebetween to reveal the interface between the second column and the drill bit or the first column for delinking the second column relative to the drill bit or the first column, the second clamping mechanism being rotatable around the longitudinal axis;
   a second actuator to facilitate turning of the second clamping mechanism about the longitudinal axis relative to the first clamping mechanism; and
   a third actuator adapted to be coupled to the second column to fully delink the second column from the first column or the drill bit, wherein the second clamping mechanism is positioned along the longitudinal axis between the first clamping mechanism and the third actuator.

2. The system as claimed in claim 1 further including a drive mechanism adapted to move the one or more columns relative to the first clamping mechanism and the second clamping mechanism to reveal the interface through the gap.

3. The system as claimed in claim 1, wherein the first clamping mechanism includes first clamping jaws and first wear pads coupled to the first clamping jaws, the first clamping jaws being actuatable to engage with one of the drill bit or the first column.

4. The system as claimed in claim 3, wherein the first clamping mechanism further includes at least one first clamp actuator adapted to actuate the first clamping jaws to engage with one of the drill bit or the first column.

5. The system as claimed in claim 1, wherein the second clamping mechanism includes second clamping jaws and second wear pads coupled to the second clamping jaws, the second clamping jaws being actuatable to engage with the second column.

6. The system as claimed in claim 5, wherein the second clamping mechanism further includes at least one second clamp actuator, the at least one second clamp actuator adapted to actuate the second clamping jaws to engage with the second column.

7. The system as claimed in claim 1, wherein the first column includes a hammer adapted to transmit a hammering action to the drill bit to drill the borehole.

8. A machine, comprising:
   a main frame;
   a mast coupled to the main frame and adapted to be moved for alignment along a height and a width of the main frame;
   a drill assembly slidably retained relative to the mast and adapted to facilitate drilling of a borehole through a surface, the drill assembly including:
   a drill bit; and
   one or more columns directly interlinked with each other and with the drill bit at interfaces defining breakout regions, and adapted to extend the drill bit into the borehole; and
   a system for disassembling the one or more columns and the drill bit of the drill assembly, the system including:
   a first clamping mechanism adapted to engage one of the drill bit or a first column of the one or more columns;
   a second clamping mechanism adapted to engage a second column of the one or more columns, the second column being disposed successively to the one of the drill bit or the first column, the second clamping mechanism adapted to be turned relative to the first clamping mechanism to at least partially delink the second column from the first column or the drill bit;
   a first actuator adapted to move the first clamping mechanism parallel to a longitudinal axis of the drill assembly relative to the second clamping mechanism to define a gap therebetween to reveal the interface between the second column and the drill bit or the first column for delinking the second column relative to the drill bit or the first column, the second clamping mechanism being rotatable around the longitudinal axis;
   a second actuator to facilitate turning of the second clamping mechanism about the longitudinal axis relative to the first clamping mechanism; and a third actuator adapted to be coupled to the second column to fully delink the second column from the first column or the drill bit, wherein the second clamping mechanism is positioned along the longitudinal axis between the first clamping mechanism and the third actuator.

9. The machine as claimed in claim 8, wherein the system further includes a drive mechanism adapted to move the one or more columns relative to the first clamping mechanism and the second clamping mechanism to reveal the interface through the gap.

10. The machine as claimed in claim 8, wherein the first clamping mechanism includes first clamping jaws and first wear pads coupled to the first clamping jaws, the first clamping jaws being actuatable to engage with one of the drill bit or the first column.

11. The machine as claimed in claim 10, wherein the first clamping mechanism further includes at least one first clamp actuator adapted to actuate the first clamping jaws to engage with one of the drill bit or the first column.

12. The machine as claimed in claim 8, wherein the second clamping mechanism includes second clamping jaws and second wear pads coupled to the second clamping jaws, the second clamping jaws being actuatable to engage with the second column.

13. The machine as claimed in claim 12, wherein the second clamping mechanism further includes at least one second clamp actuator, the at least one second clamp actuator adapted to actuate the second clamping jaws to engage with the second column.

14. The machine as claimed in claim 8, wherein the first column includes a hammer adapted to transmit a hammering action to the drill bit to drill the borehole.

15. A method for disassembling a drill assembly, the drill assembly including a drill bit and one or more columns directly interlinked with each other at interfaces defining breakout regions, the one or more columns adapted to extend the drill bit into a borehole defined through a surface, the method comprising:
    moving, by a first actuator, a first clamping mechanism parallel to a longitudinal axis of the drill assembly relative to a second clamping mechanism to define a gap therebetween to reveal the interface between a first column of the one or more columns or the drill bit and a second column of the one or more columns, the second column being disposed successively to the one of the drill bit or the first column for delinking the second column relative to the drill bit or the first column, the second clamping mechanism being rotatable around the longitudinal axis;
    moving, by a third actuator, the drill assembly to position a second end portion of the second column within a second cavity of the second clamping mechanism;
    moving, by the first actuator, the first clamping mechanism toward the second clamping mechanism to position the drill bit or a first end portion of the first column within a first cavity of the first clamping mechanism;
    engaging one of the drill bit or the first column by the first clamping mechanism;
    engaging the second column by the second clamping mechanism; and
    turning, by a second actuator, the second clamping mechanism about the longitudinal axis relative to the first clamping mechanism to at least partially delink the second column from the first column or the drill bit, wherein the second clamping mechanism is positioned along the longitudinal axis between the first clamping mechanism and the third actuator.

* * * * *